US010279517B2

(12) United States Patent
Munenobu et al.

(10) Patent No.: US 10,279,517 B2
(45) Date of Patent: *May 7, 2019

(54) GLASS-FIBER-REINFORCED THERMOPLASTIC RESIN MOLDING PRODUCT, AND PRODUCTION METHOD THEREFOR

(71) Applicant: SUMITOMO RIKO COMPANY LIMITED, Komaki-shi, Aichi (JP)

(72) Inventors: Kanako Munenobu, Komaki (JP); Junichiro Suzuki, Komaki (JP); Masayoshi Nakano, Komaki (JP); Motoshige Hibino, Komaki (JP)

(73) Assignee: SUMITOMO RIKO COMPANY LIMITED, Komaki-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/378,210

(22) Filed: Dec. 14, 2016

(65) Prior Publication Data

US 2017/0095953 A1    Apr. 6, 2017

Related U.S. Application Data

(63) Continuation of application No. PCT/JP2016/057620, filed on Mar. 10, 2016.

(30) Foreign Application Priority Data

Mar. 26, 2015  (JP) ................. 2015-065111

(51) Int. Cl.
| B29K 77/00 | (2006.01) |
| B29C 45/00 | (2006.01) |
| C08K 7/14 | (2006.01) |
| C08L 101/00 | (2006.01) |
| C08J 5/04 | (2006.01) |
| C08K 3/04 | (2006.01) |
| C08K 5/3465 | (2006.01) |
| B29K 101/12 | (2006.01) |
| B29K 105/00 | (2006.01) |
| B29K 105/12 | (2006.01) |
| B29K 105/16 | (2006.01) |
| B29K 509/08 | (2006.01) |

(52) U.S. Cl.
CPC .......... *B29C 45/0005* (2013.01); *C08J 5/043* (2013.01); *C08K 3/04* (2013.01); *C08K 5/3465* (2013.01); *C08K 7/14* (2013.01); *C08L 101/00* (2013.01); *B29K 2077/00* (2013.01); *B29K 2101/12* (2013.01); *B29K 2105/0032* (2013.01); *B29K 2105/12* (2013.01); *B29K 2105/16* (2013.01); *B29K 2509/08* (2013.01); *C08J 2377/06* (2013.01)

(58) Field of Classification Search
None
See application file for complete search history.

(56) References Cited

U.S. PATENT DOCUMENTS

| 4,238,266 | A | * | 12/1980 | Steinberg | ................ B29C 70/00 156/243 |
| 6,096,818 | A | * | 8/2000 | Nakaura | ................... C08K 3/04 252/511 |
| 2002/0099124 | A1 | | 7/2002 | Patel | |
| 2004/0012121 | A1 | | 1/2004 | Lang et al. | |
| 2004/0023012 | A1 | * | 2/2004 | Kia | ........................ B29C 70/30 428/212 |
| 2007/0122615 | A1 | | 5/2007 | Mutsuda et al. | |
| 2009/0131208 | A1 | | 5/2009 | Hawryluck et al. | |
| 2011/0124789 | A1 | | 5/2011 | Choi et al. | |
| 2012/0235334 | A1 | | 9/2012 | Suzuki | |
| 2015/0259511 | A1 | | 9/2015 | Nakano et al. | |
| 2017/0121838 | A1 | * | 5/2017 | Tatebe | ................... C25D 11/16 |

FOREIGN PATENT DOCUMENTS

| AU | 2002301429 B2 | 3/2003 |
| DE | 2213305 A1 | 9/1972 |
| GB | 1392175 A | 4/1975 |
| JP | 51-46357 A | 4/1976 |
| JP | 62-268612 A | 11/1987 |
| JP | 8-269228 A | 10/1996 |
| JP | 2001-179738 A | 7/2001 |
| JP | 2002-003691 A | 1/2002 |

(Continued)

OTHER PUBLICATIONS

English Machine Translation of WO 2001/059009, obtained from JPO on Jun. 19, 2017.*
English Machine Translation of JP2002-053711, obtained from JPO on Jun. 19, 2017.*
"Nylon 66 (Polyamide 66) Long Fiber Reinforced Thermoplastic Composites", obtained Oct. 12, 2017, PlastiComp, Inc., http://www.plasticomp.com/data-sheets-nylon-66/.*

(Continued)

*Primary Examiner* — Callie E Shosho
*Assistant Examiner* — Krupa Shukla
(74) *Attorney, Agent, or Firm* — Westerman, Hattori, Daniels & Adrian, LLP

(57) ABSTRACT

A glass-fiber-reinforced thermoplastic resin molding product is provided, which includes a thermoplastic resin, a fibrous filler dispersed in the thermoplastic resin, and at least one of a dye and a pigment having an average particle diameter of at most 30 nm, the fibrous filler including:

(A) 40 to 80% of glass fibers each having a length of not less than 0.05 mm and less than 0.5 mm;

(B) 15 to 40% of glass fibers each having a length of not less than 0.5 mm and less than 1.0 mm;

(C) 2 to 30% of glass fibers each having a length of not less than 1.0 mm and less than 3.0 mm; and (D) at most 1% of glass fibers each having a length of not less than 3.0 mm.

11 Claims, No Drawings

(56) References Cited

FOREIGN PATENT DOCUMENTS

| | | | |
|---|---|---|---|
| JP | 2002-53711 A | | 2/2002 |
| JP | 2003-285323 A | | 10/2003 |
| JP | 2005-297338 A | | 10/2005 |
| JP | 2005-298663 A | | 10/2005 |
| JP | 2005-298664 A | | 10/2005 |
| JP | 2005-532934 A | | 11/2005 |
| JP | 2010-189637 A | | 9/2010 |
| JP | 2010248494 A | * | 11/2010 |
| JP | 2010-538104 A | | 12/2010 |
| JP | 2012-25844 A | | 2/2012 |
| JP | 2016-166276 A | | 9/2016 |
| WO | 01/59009 A1 | | 8/2001 |
| WO | 2012/124060 A1 | | 9/2012 |

OTHER PUBLICATIONS

Machine translation of JP 2010248494 A, retrieved May 14, 2018.*
Satoh et al., The Generation Mechanism of Material Property Distribution for Thin FRP Products during Injection Molding: Influence of Cavity Thinning on Fiber Breakage, Journal of the Japan Society of Polymer Processing, 2006, vol. 18, No. 3, p. 227-234 (English abstract only) (1 page).
Furuhasi et al., The Generation Mechanism of Material Property Distribution Induced by Fiber Behavior for FRP Products during Injection Molding: Detailed Analyses of Fiber Length Distribution in Thin Plates, Journal of the Japan Society of Polymer Processing, 2009, vol. 21, No. 4, p. 211-216 (English abstract only) (1 page).
International Search Report dated Jun. 14, 2016, issued in counterpart International Application No. PCT/JP2016/057620 (3 pages).
International Search Report dated Dec. 16, 2014, issued in International Application No. PCT/JP2014/073273, with English translation. (4 pages).
Office Action dated Sep. 23, 2016, issued in German Application No. 112014001601.2, with English translation. (7 pages).
Office Action dated May 31, 2017, issued in Chinese Application No. 201480042083.9, with English translation. (10 pages).
Non-Final Office Action dated Jun. 29, 2017, issued in U.S. Appl. No. 14/729,540. (46 pages).
Office Action dated Jun. 29, 2016, issued in German Application No. 112014001601.2, with English translation. (2 pages).
International Preliminary Report on Patentability dated Mar. 29, 2016, issued in International Application No. PCT/JP2014/073273. (7 pages).
Final Office Action dated Feb. 26, 2018, issued in U.S. Appl. No. 14/729,540 (43 pages).
Notification of Transmittal of Translation of the International Preliminary Report on Patentability (Form PCT/IB/338) issued in counterpart International Application No. PCT/JP2016/057620 dated Oct. 5, 2017, with Forms PCT/IB/373 and PCT/ISA/237. (11 pages).
Non-Final Office Action dated Sep. 10, 2018, issued in U.S. Appl. No. 14/729,540. (20 pages).

* cited by examiner

GLASS-FIBER-REINFORCED THERMOPLASTIC RESIN MOLDING PRODUCT, AND PRODUCTION METHOD THEREFOR

TECHNICAL FIELD

The present disclosure relates to a glass-fiber-reinforced thermoplastic resin molding product having a strength improved by dispersing glass fibers therein, and to a production method for the molding product. More specifically, the disclosure relates to a glass-fiber-reinforced thermoplastic resin molding product which exhibits excellent performance for use as a mount, a bush or a torque rod, and to a production method for the molding product.

BACKGROUND ART

Parts for use in automotive engine rooms are required to have sufficient physical properties, e.g., sufficient strength, water resistance, heat resistance and resistance to calcium chloride (which is used as a snow melting agent), under higher temperature and higher humidity conditions. Conventionally, these parts are generally made of metal. In recent years, it has been contemplated to use automotive parts made of a fiber-reinforced resin (FRP) instead of the metal automotive parts to meet a need for weight reduction. Particularly, a glass fiber reinforcement thermoplastic resin containing glass fibers dispersed therein is excellent in versatility, processability, moldability and the like and advantageous in terms of costs and, therefore, is expected to find applications in the aforementioned field. A glass-fiber-reinforced thermoplastic resin molding product is typically produced by met-kneading a thermoplastic resin together with glass fibers, pelletizing the resulting mixture, melting the resulting pellets again and injection-molding the resulting melt (see, for example, PTL 1 to PTL 3).

RELATED ART DOCUMENT

Patent Document

PTL 1: JP-A-2012-25844
PTL 2: JP-A-2003-285323
PTL 3: JP-A-2010-189637
PTL 4: WO2012-124060

SUMMARY OF INVENTION

Where the intended molding product is produced by once pelletizing the glass fiber/thermoplastic resin mixture, however, the glass fibers are broken by a shear stress in a melt-kneading machine during the pelletization to be thereby reduced in size (to a fiber length of at most 0.5 mm), and further receives a shear stress during the injection molding to be thereby further reduced in size. Therefore, the glass fibers present in the molding product thus produced are excessively reduced in size, so that the strength improving effect for the molding product is problematically reduced. Particularly, where a pigment is added to the FRP material for coloring the molding product, the pigment increases the percentage of the breakage of the glass fibers in the melt-kneading machine and the injection molding machine, thereby further reducing the size of the glass fibers. This more seriously reduces the strength improving effect for the colored molding product.

To cope with this, it is contemplated to use filament reinforcement resin pellets (pellets containing glass filaments prepared as each having a longer fiber length by a drawing method). However, this adversely influences the moldability and, where a molding product such as a mount, a bush or a torque rod is produced, the molding product has a greater residual stress in the presence of the filaments. Further, a resin having a lower molecular weight should be used to increase the penetrability of the resin to the glass filaments. Problematically, this makes it impossible to impart the molding product with sufficient strength. PTL 2 and PTL 3 propose methods in which filament reinforcement resin pellets and staple fiber reinforcement resin pellets are mixed together and the resulting mixture is used for the molding. This improves the moldability, but the problem associated with the residual stress is not solved because the fiber length distribution has a double peak profile.

Where the molding product molded from the conventional glass fiber reinforcement thermoplastic resin has a smaller wall thickness, the molding product problematically has a reduced mechanical strength, particularly, in a high temperature atmosphere or in a moisture absorbed state. This problem is solved by imparting the molding product with an increased wall thickness, but the weight reducing effect is problematically reduced.

To solve the aforementioned problem, PTL 4 proposes a method for producing an intended molding product by preparing fiber reinforcement resin materials for a skin layer and a core layer respectively having different flexural elastic moduli and sandwich-molding the materials. However, the sandwich-molding product has a layer interface and, therefore, is liable to have an insufficient strength. Further, the sandwich-molding requires a special molding machine, thereby increasing production costs.

In view of the foregoing, it is an object to provide a glass-fiber-reinforced colored thermoplastic resin molding product which has excellent mechanical strength in a high temperature atmosphere or in a moisture absorbed state even without imparting the molding product with a greater wall thickness or taking other measures, and has sufficient distortion resistance and sufficient strength, and to provide a production method therefor.

According to a first inventive aspect to achieve the object described above, there is provided a glass-fiber-reinforced thermoplastic resin molding product including a thermoplastic resin, a fibrous filler dispersed in the thermoplastic resin and at least one of a dye and a pigment having an average particle diameter of at most 30 nm, the fibrous filler including:

(A) 40 to 80% of glass fibers each having a length of not less than 0.05 mm and less than 0.5 min;
(B) 15 to 40% of glass fibers each having a length of not less than 0.5 mm and less than 1.0 mm;
(C) 2 to 30% of glass fibers each having a length of not less than 1.0 mm and less than 3.0 mm; and
(D) at most 1% of glass fibers each having a length of not less than 3.0 mm, based on the total number of fibers of the fibrous filler present in the glass-fiber-reinforced thermoplastic resin molding product.

According to a second inventive aspect, there is provided a method for producing a glass-fiber-reinforced thermoplastic resin molding product ($\alpha$), the method including the steps of feeding glass fibers and a mixture of a thermoplastic resin and at least one of a dye and a pigment having an average particle diameter of at most 30 nm directly into an injection molding machine, and injection-molding the resulting mixture, the glass-fiber-reinforced thermoplastic resin molding product (α) including the thermoplastic resin, a fibrous filler dispersed in the thermoplastic resin and the at least one of the dye and the pigment having an average particle diameter of at most 30 nm, the fibrous filler including:
- (A) 40 to 80% of glass fibers each having a length of not less than 0.05 mm and less than 0.5 mm;
- (B) 15 to 40% of glass fibers each having a length of not less than 0.5 mm and less than 1.0 mm;
- (C) 2 to 30% of glass fibers each having a length of not less than 1.0 mm and less than 3.0 mm; and
- (D) at most 1% of glass fibers each having a length of not less than 3.0 mm, based on the total number of fibers of the fibrous filler present in the glass-fiber-reinforced thermoplastic resin molding product.

According to a third inventive aspect, there is provided a method for producing a glass-fiber-reinforced thermoplastic resin molding product (α), the method including the steps of feeding glass fibers, a thermoplastic resin and at least one of a dye and a pigment having an average particle diameter of at most 30 nm directly into an injection molding machine, and injection-molding the resulting mixture, the glass-fiber-reinforced thermoplastic resin molding product (α) including the thermoplastic resin, a fibrous filler dispersed in the thermoplastic resin and the at least one of the dye and the pigment having an average particle diameter of at most 30 nm, the fibrous filler including:
- (A) 40 to 80% of glass fibers each having a length of not less than 0.05 mm and less than 0.5 mm;
- (B) 15 to 40% of glass fibers each having a length of not less than 0.5 mm and less than 1.0 mm;
- (C) 2 to 30% of glass fibers each having a length of not less than 1.0 mm and less than 3.0 mm; and
- (D) at most 1% of glass fibers each having a length of not less than 3.0 mm, based on the total number of fibers of the fibrous filler present in the glass-fiber-reinforced thermoplastic resin molding product.

The inventors conducted intensive studies to solve the aforementioned problems. As a result, the inventors focused on the lengths of reinforcement fibers contained in a glass-fiber-reinforced thermoplastic resin molding product and found that, where the reinforcement fibers have a specific glass fiber length distribution defined by the glass fibers (A) to (D) described above, the glass-fiber-reinforced thermoplastic resin molding product has excellent mechanical strength in the high temperature atmosphere or in the moisture absorbed state even without imparting the molding product with a greater wall thickness design or taking other measures, and has sufficient distortion resistance and sufficient strength. Thus, the inventors attained the present disclosure.

It is difficult to provide the specific glass fiber length distribution described above by the conventional method in which the mixture of the glass fibers and the thermoplastic resin is once pelletized and then the resulting pellets are used for the injection molding or the like to produce the molding product. Particularly, where the colored molding product is to be produced with the use of a colorant, the colorant increases the percentage of the breakage of the glass fibers in the melt-kneading machine or the injection molding machine. Therefore, the glass fibers are liable to be reduced in size, making it further difficult to provide the specific glass fiber length distribution. The inventors found that, where the intended glass-fiber-reinforced thermoplastic resin molding product is produced by feeding the glass fibers and a mixture of the colorant and the thermoplastic resin directly into the injection molding machine and injection-molding the resulting mixture, and the dye or the pigment having an average particle diameter of at most 30 nm is used as the colorant, the breakage of the glass fibers due to the colorant is prevented, making it possible to facilitate the production of the colored molding product having the specific glass fiber length distribution defined by the glass fibers (A) to (D). The inventors also found that, even if the aforementioned specific colorant is not preliminarily mixed with the thermoplastic resin but directly fed together with the thermoplastic resin and the glass fibers into the injection molding machine, the breakage of the glass fibers due to the colorant is prevented, making it possible to produce the colored molding product having the specific glass fiber length distribution defined by the glass fibers (A) to (D).

As described above, the glass-fiber-reinforced thermoplastic resin molding product according to the present disclosure contains the specific colorants such as the dye and the pigment having an average particle diameter of at most 30 nm to be thereby colored, and further contains the fibrous filler including the aforementioned percentages of the glass fibers (A) to (D) having the aforementioned fiber lengths and dispersed in the thermoplastic resin. Therefore, the glass-fiber-reinforced thermoplastic resin molding product has excellent mechanical strength in the high temperature atmosphere or in the moisture absorbed state even without imparting the molding product with a greater wall thickness design or taking other measures, and has sufficient distortion resistance and sufficient strength. Further, the glass-fiber-reinforced thermoplastic resin molding product permits flexible color design without impairing the aforementioned properties and, therefore, meets the need for coloring. Where the molding product is used as an automotive bearing part such as an engine mount, a bush or a torque rod, for example, the molding product exhibits excellent performance.

Particularly, where the glass fibers are present in a total proportion of 25 to 65 wt. % in the glass-fiber-reinforced thermoplastic resin molding product, it is possible to efficiently provide the desired reinforcing effect.

Where the weight average fiber length of glass fibers dispersed in an inner portion of the glass-fiber-reinforced thermoplastic resin molding product is greater than the weight average fiber length of glass fibers dispersed in a surface portion of the glass-fiber-reinforced thermoplastic resin molding product and a difference between these weight average fiber lengths is not less than 30 μm, the surface portion (skin layer) of the molding product which may be significantly deformed is imparted with toughness, and the inner portion (core layer) of the molding product which may be finally broken is imparted with higher rigidity. As a result, the glass-fiber-reinforced thermoplastic resin molding product has a higher fracture strength.

Where the weight average fiber length of the glass fibers dispersed in the surface portion of the glass-fiber-reinforced thermoplastic resin molding product is in a range of 0.35 to 1.5 mm and the weight average fiber length of the glass fibers dispersed in the inner portion of the glass-fiber-reinforced thermoplastic resin molding product is in a range of 0.4 to 2.8 mm, the surface portion (skin layer) of the molding product which may be significantly deformed is imparted with higher toughness, and the inner portion (core layer) of the molding product which may be finally broken is imparted with further higher rigidity. As a result, the glass-fiber-reinforced thermoplastic resin molding product has a further higher fracture strength.

Where the thermoplastic resin is at least one selected from the group consisting of a polyamide resin, a polyethylene resin, a polypropylene resin, a polystyrene resin, a polycarbonate resin, an acrylonitrile butadiene styrene copolymer resin, a polyethylene terephthalate resin, a polybutylene terephthalate resin, a polyacetal resin, a modified polyphenylene ether resin and a polyphenylene sulfide resin, the glass-fiber-reinforced thermoplastic resin molding product according to the present disclosure can be advantageously produced.

Where at least one of the dye and the pigment is present in a total proportion of 0.01 to 1 wt. % in the glass-fiber-reinforced thermoplastic resin molding product, a desired coloring effect can be provided without impairing the toughness and the strength of the molding product.

Where the glass-fiber-reinforced thermoplastic resin molding product according to the present disclosure is an automotive bearing part, the automotive bearing part has excellent mechanical strength in the high temperature atmosphere or in the moisture absorbed state, and has sufficient distortion resistance and sufficient strength. Therefore, the molding product can be advantageously used as the automotive bearing part.

The glass-fiber-reinforced thermoplastic resin molding product according to the present disclosure can be advantageously produced as having the specific glass fiber length distribution defined by the glass fibers (A) to (D) by the specific production method including the steps of feeding the glass fibers and the mixture of the specific colorant and the thermoplastic resin directly into the injection molding machine and injection-molding the resulting mixture.

The glass-fiber-reinforced thermoplastic resin molding product according to the present disclosure can be advantageously produced as having the specific glass fiber length distribution defined by the glass fibers (A) to (D) even if the specific colorant, the thermoplastic resin and the glass fibers are fed directly into the injection molding machine without the preliminary mixing of the colorant and the thermoplastic resin.

DESCRIPTION OF EMBODIMENTS

Next, an embodiment of the present disclosure will be described in detail.

A glass-fiber-reinforced thermoplastic resin molding product according to the embodiment of the present disclosure includes a thermoplastic resin and a fibrous filler dispersed in the thermoplastic resin, and the fibrous filler includes:

(A) 40 to 80% of glass fibers each having a length of not less than 0.05 mm and less than 0.5 min;
(B) 15 to 40% of glass fibers each having a length of not less than 0.5 mm and less than 1.0 mm;
(C) 2 to 30% of glass fibers each having a length of not less than 1.0 mm and less than 3.0 mm; and
(D) at most 1% of glass fibers each having a length of not less than 3.0 mm, based on the total number of fibers of the fibrous filler present in the molding product. The glass-fiber-reinforced thermoplastic resin molding product further includes at least one of a dye and a pigment having an average particle diameter of at most 30 nm to be thereby colored. The average particle diameter of the pigment is the number average particle diameter of the pigment, i.e., the primary particle diameter of the pigment, determined through measurement by means of an electron microscope (hereinafter, the same definition is applied). By thus controlling the glass fiber length distribution, a residual stress occurring due to differences in fiber length is reduced. If the percentage of the glass fibers (D) each having a length of not less than 3.0 mm is greater, the molding product loses its toughness and suffers from stress concentration, thereby having a reduced fracture strength depending on the shape thereof. If the percentage of the glass fibers (A) each having a length of not less than 0.05 mm and less than 0.5 mm is excessively great, the benefit produced by the fiber reinforcement is lost. To suppress the residual stress, it is optimal to respectively control the percentage of the glass fibers (B) each having a length of not less than 0.5 mm and less than 1.0 mm and the percentage of the glass fibers (C) each having a length of not less than 1.0 mm and less than 3.0 mm within the aforementioned ranges. Thus, the fiber reinforcing effect is enhanced even when the molding product is in the high temperature atmosphere or in the moisture absorbed state. Therefore, the molding product has an improved strength.

The percentages of the glass fibers (A), (B), (C) and (D) respectively having the aforementioned fiber lengths are particularly preferably 50 to 75%, 20 to 40%, 2 to 25%, and at most 1%, respectively, because the resulting molding product is more excellent in mechanical strength in the high temperature atmosphere or in the moisture absorbed state.

The percentages of the glass fibers (A) to (D) are based on the total number of fibers of the fibrous filler as described above, and may be each measured by a glass fiber length distribution measuring method disclosed, for example, in JP-A-2002-5924. More specifically, the molding product is ashed at a temperature of 500° C. to 700° C., and then ashed glass fibers are homogeneously dispersed in water having a weight that is 1000 times the total weight of the ashed glass fibers, and a part of the resulting homogenous dispersion is taken out in an amount such that the weight of glass fibers contained in the dispersion is 0.1 to 2 mg. Then, the glass fibers are extracted from the part of the homogenous dispersion by filtering or drying. In turn, the fiber lengths of the respective glass fibers thus extracted are measured, and the percentages (%) of the glass fibers (A) to (D) based on the total number of the glass fibers are determined. The measurement of the fiber lengths may be achieved by selecting fibers at random from the ashed residual fiber mass rather than by dispersing the fibers in the water. In the glass fiber length distribution measuring method disclosed in the aforementioned patent literature, the extraction of the glass fibers from the molding product is achieved by melting and asking the thermoplastic resin (the polymer of the molding product) at a high temperature, but may be achieved by dissolving the thermoplastic resin in a solvent. As apparent from the glass fiber length distribution measuring method disclosed in the aforementioned patent literature, the glass fiber length distribution defined by the glass fibers (A) to (D) does not indicate a distribution state of the glass fibers in the material (resin composition) for the molding product, but indicate a distribution state of the glass fibers in the molding product (cured resin product). The measurement of the lengths and the number of the fibers is based on an image obtained by photographing the fibers by means of a microscope.

The total proportion of the glass fibers present in the glass-fiber-reinforced thermoplastic resin molding product according to the embodiment of the present disclosure is preferably 25 to 65 wt. %, more preferably 40 to 60 wt. %. This makes it possible to provide the desired reinforcing effect. The total proportion of the glass fibers, which is not relevant to the fiber lengths, may be determined when ingredients for the molding product are prepared.

In the embodiment of the present disclosure, the weight average fiber length of glass fibers dispersed in an inner portion of the glass-fiber-reinforced thermoplastic resin molding product is preferably greater than the weight average fiber length of glass fibers dispersed in a surface portion of the glass-fiber-reinforced thermoplastic resin molding product, and a difference between these weight average fiber lengths is preferably not less than 30 μm. The difference is particularly preferably not less than 50 μm. Thus, the surface portion (skin layer) which may be significantly deformed is imparted with toughness, and the inner portion (core layer) of the molding product which may be finally broken is imparted with higher rigidity, whereby the glass-fiber-reinforced thermoplastic resin molding product has a higher fracture strength. Here, the surface portion (skin layer) is a portion having a depth that is up to 15% of the thickness of the molding product as measured thicknesswise from the surface of the molding product. The inner portion (core layer) of the molding product is a portion having a greater depth than the surface portion. Where the molding product is produced by the injection molding as having the specific glass fiber length distribution defined by the glass fibers (A) to (D), the molding product is easily imparted with this structure.

From this aspect, it is preferred that the weight average fiber length of the glass fibers dispersed in the surface portion of the glass-fiber-reinforced thermoplastic resin molding product is 0.35 to 1.5 mm and the weight average fiber length of the glass fibers dispersed in the inner portion of the glass-fiber-reinforced thermoplastic resin molding product is 0.4 to 2.8 mm. It is more preferred that the weight average fiber length of the glass fibers dispersed in the surface portion of the molding product is 0.4 to 1.0 mm and the weight average fiber length of the glass fibers dispersed in the inner portion of the molding product is 0.45 to 1.5 mm. Thus, the surface portion (skin layer) which may be significantly deformed is imparted with higher toughness, and the inner portion (core layer) of the molding product which may be finally broken is imparted with higher rigidity. Thus, the glass-fiber-reinforced thermoplastic resin molding product has a higher fracture strength.

The weight average fiber lengths of the glass fibers in the skin layer and in the core layer are determined, for example, in the following manner. About 1 g of a sample is sampled from each of the layers, and heat-treated at a temperature of 500° C. to 700° C. to be ashed. Then, fibers are selected at random from the residual fiber mass, and photographed by means of a microscope. Based on the resulting image, the weight average fiber length in each of the layers is determined from the following expression (1). Fibers having vague figures (having a length of less than 0.05 mm) and fibers partly extending outside the image are excluded from the measurement.

$$\text{Weight average fiber length } (Lw) = (\Sigma qi \times Li^2)/(\Sigma qi \times Li) \quad (1)$$

wherein Li is the length of a fiber and qi is the number of fibers each having the fiber length Li.

According to the embodiment of the present disclosure, it is preferred, in terms of the properties of the glass-fiber-reinforced thermoplastic resin molding product, that the skin layer and the core layer both have the glass fiber length distribution defined by the glass fibers (A) to (D). The glass fiber distribution states of the skin layer and the core layer are determined based on samples respectively sampled from the skin layer and the core layer in conformity with the aforementioned glass fiber distribution determining methods for the overall resin molding product.

Examples of the thermoplastic resin to be used for the glass-fiber-reinforced thermoplastic resin molding product according to the embodiment of the present disclosure include polyamide resins, polyethylene resins, polypropylene resins, polystyrene resins, polycarbonate resins, acrylonitrile butadiene styrene copolymer resins, polyethylene terephthalate resins, polybutylene terephthalate resins, polyacetal resins, modified polyphenylene ether resins and polyphenylene sulfide resins, which may be used alone or in combination. Particularly, the polyamide resins are preferred for the strength in the high temperature atmosphere, the elasticity, the melt viscosity and the like.

Examples of the polyamide resins include polyamides 6, polyamides 46, polyamides 66, polyamides 610, polyamides 612, polyamides 11, polyamides 12, polyamides 92, polyamides 99, polyamides 912, polyamides 1010, polyamides 6I, polyamides 6T, polyamides 9T, polyamides 10T, polyamides 11T, polyamides MXD6, polyamides 6T/6I, polyamides 6/6I, polyamides 66/6T and polyamides 66/6I, and polyamide copolymers including at least two polyamide components selected from polyamide components of these polyamides having different structures.

At least one of the dye and the pigment having an average particle diameter of at most 30 nm is used as the colorant for the glass-fiber-reinforced thermoplastic resin molding product according to the embodiment of the present disclosure.

Examples of the dye include oil dyes, acid dyes, basic dyes and disperse dyes of azo, anthraquinone, perinone, perylene, phthalocyanine, carbonium and indigoid.

The pigment is not particularly limited, as long as it has an average particle diameter of at most 30 nm. Examples of the pigment include organic pigments (of phthalocyanine, anthraquinone, isoindolinone, quinacridone, perylene and azo), and inorganic pigments (of oxides such as titanium oxide, red iron oxide (ferric oxide), chromium oxide and cobalt blue, sulfides such as cadmium yellow and cadmium red, chromates such as chrome yellow, silicates such as ultramarine, metal powders such as metallic powders and pearlescent powders, and carbon black.).

For weather resistance, carbon black having an average particle diameter of at most 30 nm is preferably used as the colorant.

The proportion of the colorant to be contained in the glass-fiber-reinforced thermoplastic resin molding product according to the embodiment of the present disclosure is preferably in a range of 0.01 to 1 wt. %, more preferably in a range of 0.03 to 0.3 wt. %. If the proportion of the colorant is excessively small, it will be impossible to provide the desired coloring effect. If the proportion of the colorant is excessively great, the glass-fiber-reinforced thermoplastic resin molding product is liable to have a reduced toughness and a reduced strength.

Examples of the glass fibers to be used for the glass-fiber-reinforced thermoplastic resin molding product according to the embodiment of the present disclosure include filaments obtained by melt-spinning glass such as E glass (electrical glass), C class (chemical glass), A glass (alkali glass), S glass (high strength glass) and alkali-proof glass. The glass fibers preferably each have a fiber diameter of 3 to 25 μm, more preferably 8 to 20 μm.

The molding product may contain aramid fibers (AF) or carbon fibers (CF) as the fibrous filler in addition to the glass fibers dispersed therein in the aforementioned proportion. It is desirable that the additional fibrous filler is used in a small proportion and substantially only the glass fibers are used as the fibrous filler. The proportion of the fibrous filler other than the glass fibers is limited within a proportion determined by subtracting the amounts of the glass fibers (A) to (D) from the amount of the overall fibrous filler.

As required, a heat stabilizer, an antioxidant, an inorganic filler, a nucleating agent, a weather-proofing agent, a plasticizer, a lubricant, an impact resistant material and the like may be added to the material for the glass-fiber-reinforced thermoplastic resin molding product according to the embodiment of the present disclosure.

The glass-fiber-reinforced thermoplastic resin molding product according to the embodiment of the present disclosure is produced, for example, in the following manner.

The glass fibers, the thermoplastic resin and the colorant are fed in necessary amounts directly into an injection molding machine for each shot, and the resulting mixture is injection-molded into the intended glass-fiber-reinforced thermoplastic resin molding product. In the conventional method in which the molding product is produced by once pelletizing the mixture of the glass fibers and the thermoplastic resin and using the resulting pellets for injection-molding, it is very difficult to provide the specific glass fiber length distribution specified according to the embodiment of the present disclosure. That is, the aforementioned direct molding method obviates the need for the kneading step, thereby preventing the reduction in the fiber lengths of the glass fibers. Thus, the specific fiber length distribution defined by the glass fibers (A) to (D) can be easily provided. Since the colorant (the dye and the pigment having an average particle diameter of at most 30 nm) hardly influences the reduction in the fiber lengths of the glass fibers, the coloring does not adversely influence the glass fiber length distribution. In this production method, the number of thermal histories is smaller by one than in the conventional pelletization production method. Therefore, reduction in the molecular weight of the thermoplastic resin during the molding is minimized, thereby significantly improving the strength of the resin molding product.

In another production method, the colorant is preliminarily mixed with the thermoplastic resin, and the resulting mixture and the glass fibers are fed in necessary amounts directly into an injection molding machine for each shot. Then, the resulting mixture is injection-molded into the intended glass-fiber-reinforced thermoplastic resin molding product. Alternatively, a master batch may be prepared by preliminarily mixing the colorant at a higher concentration with the thermoplastic resin. In this case, a colorant-free thermoplastic resin, the master batch and the glass fibers are fed in necessary amounts directly into an injection molding machine for each shot, and the resulting mixture is injection-molded into the intended glass-fiber-reinforced thermoplastic resin molding product. A melt-kneading machine or an injection molding machine may be used for the mixing of the thermoplastic resin and the colorant.

The glass fibers to be used in the aforementioned production methods typically each have a fiber length of 2 to 6 mm, preferably 3 mm to 5 mm.

The glass-fiber-reinforced thermoplastic resin molding product thus produced according to the embodiment of the present disclosure has excellent mechanical strength in the high temperature atmosphere or in the moisture absorbed state even without imparting the molding product with a greater wall thickness or taking other measures, and has sufficient distortion resistance and sufficient strength. Therefore, the glass-fiber-reinforced thermoplastic resin molding product is advantageously used as an automotive bearing part. Examples of the automotive bearing part include bearing parts for a support shaft and bearing parts for a rotation shaft. Specific preferred examples of the bearing parts include transmission mounts, body mounts, carburetor mounts, member mounts, differential mounts, engine mounts, connecting rods, torque rods, torsional dampers, steering rubber couplings, tension rod bushes, bushes, bound stoppers, FF engine roll stoppers, muffler hangers, stabilizer link rods, radiator supports, control arms and suspension arms for motor vehicles such as automobiles, and other automotive bearing parts.

EXAMPLES

Next, inventive examples will be described in conjunction with comparative examples. It should be understood that the present disclosure be not limited to these examples within the scope of the present disclosure.

The following ingredients were prepared for the inventive examples and the comparative examples.

[PA66]
Polyamide 66 (PA66) pellets (LEONA 1402S available from Asahi Kasei Chemicals Corporation)

[GF]
Glass chopped strands having a diameter of 13 μm and a cut length of 3 mm (T-249 available from Nippon Electric Glass Co., Ltd.)

[Staple-Fiber-Reinforcement PA]
Staple-fiber-reinforcement PA66GF50 (LEONA 14G50 X01 available from Asahi Kasei Chemicals Corporation)

[CB(i)]
Carbon black having an average particle diameter of 14 nm (SB960 available from Asahi Carbon Co., Ltd.)

[CB(ii)]
Carbon black having an average particle diameter of 22 nm (SBX45 available from Asahi Carbon Co., Ltd.)

[CB(iii)]
Carbon black having an average particle diameter of 38 nm (SB400 available from Asahi Carbon Co., Ltd.)

[CB(iv)]
Carbon black having an average particle diameter of 85 nm (SB410 available from Asahi Carbon Co., Ltd.)

[Organic Dye]
NUBIAN BLACK TH-807 available from Orient Chemical Industries Co., Ltd.

Examples 1 to 3 and Comparative Examples 1 to 5

Test pieces each conforming to ISO's multi-purpose test piece-A were each produced by feeding the aforementioned ingredients in proportions shown below in Table 1 directly into an injection molding machine and injection-molding the resulting mixture under the following molding conditions.

<<Molding Conditions>>
Injection molding machine: SH100A (φ32 mm) available from Sumitomo Heavy Industries, Ltd.
Cylinder temperature: 300° C.±10° C.
Mold temperature: 80° C.±20° C.
Injection rate: 39±5 cm²/sec
Retention pressure: 80 MPa
Screw back pressure: 5 MPa The test pieces thus produced in Examples and Comparative Examples were evaluated for physical properties based on the following criteria. The results are also shown below in Table 1.

[Fiber Length Distribution]
About 1 g of a skin layer (a portion having a depth up to 15% of the thickness of the test piece as measured thicknesswise from the surface of the test piece) and about 1 g of a core layer (an inner portion having a depth ranging from 15% to 85% of the thickness of the test piece as measured thicknesswise from the surface of the test piece) were sampled from each of the test pieces, and heat-treated at 600° C. for 3 hours by means of an electric furnace (Muffle Furnace FO810 available from Yamato Scientific Co., Ltd.) to be thereby ashed. Fibers were selected at random from each of residual fiber masses, and photographed at a magnification of 50 to 100 by means of a microscope (VHX-1000 available from Keyence Corporation) (three to five photographs were taken, and 300 to 500 fibers were observed in total). The fiber lengths of all the glass fibers present in the photographs were measured, and the percentages (%) of the following glass fibers (A) to (D) based on the total number of the glass fibers were determined. Fibers having vague figures (having a length of less than 0.05 mm) and fibers partly extending outside the images of the photographs were excluded from the measurement.

(A) Glass fibers each having a length of not less than 0.05 mm and less than 0.5 mm (B) Glass fibers each having a length of not less than 0.5 mm and less than 1.0 mm photographs were taken, and 300 to 500 fibers were observed in total). The weight average fiber lengths of the fibers in the skin layer and in the core layer were determined from the following expression (1) based on the images of the photographs. Fibers having vague figures (having a length of less than 0.05 mm) and fibers partly extending outside the images were excluded from the measurement.

$$\text{Weight average fiber length } (Lw) = (\Sigma qi \times Li^2)/(\Sigma qi \times Li) \quad (1)$$

wherein Li is the length of a fiber and qi is the number of fibers each having the fiber length Li.

[Tensile Strength]

The tensile strength of each of the test pieces was measured at a stretching speed of 5 mm/min with an inter-chuck distance of 115 mm by means of a tensile tester (AG-IS 100 kN available from Shimadzu Corporation). The test pieces of the inventive examples are required to have a tensile strength of not less than 260 MPa at an ordinary temperature (25° C., RT), and to have a tensile strength of not less than 150 MPa in a high temperature atmosphere (at 100° C.).

TABLE 1

|  | Example | | | Comparative Example | | | | | (wt. %) |
| --- | --- | --- | --- | --- | --- | --- | --- | --- | --- |
|  | 1 | 2 | 3 | 1 | 2 | 3 | 4 | 5 | |
| PA66 | 50 | 50 | 50 | — | — | — | 50 | 50 | |
| GF | 50 | 50 | 50 | — | — | — | 50 | 50 | |
| Staple fiber reinforcement PA | — | — | — | 100 | 100 | 100 | — | — | |
| CB (i) | 1 | — | — | 1 | — | — | — | — | |
| CB (ii) | — | 1 | — | — | — | — | — | — | |
| CB (iii) | — | — | — | — | 1 | — | 1 | — | |
| CB (iv) | — | — | — | — | — | 1 | — | 1 | |
| Organic dye | — | — | 1 | — | — | — | — | — | |
| Skin layer | | | | | | | | | |
| Fiber length distribution (%) A | 62 | 72 | 61 | 98 | 99 | 99 | 84 | 83 | |
| B | 34 | 25 | 34 | 2 | 1 | 1 | 15 | 16 | |
| C | 4 | 3 | 5 | 0 | 0 | 0 | 1 | 1 | |
| D | 0 | 0 | 0 | 0 | 0 | 0 | 0 | 0 | |
| Weight average fiber length (mm) | 0.59 | 0.60 | 0.60 | 0.30 | 0.27 | 0.27 | 0.46 | 0.45 | |
| Core layer | | | | | | | | | |
| Fiber length distribution (%) A | 62 | 73 | 61 | 97 | 99 | 99 | 81 | 87 | |
| B | 32 | 21 | 33 | 3 | 1 | 1 | 18 | 12 | |
| C | 6 | 6 | 6 | 0 | 0 | 0 | 1 | 1 | |
| D | 0 | 0 | 0 | 0 | 0 | 0 | 0 | 0 | |
| Weight average fiber length (mm) | 0.66 | 0.68 | 0.66 | 0.32 | 0.29 | 0.27 | 0.48 | 0.44 | |
| Tensile strength (MPa) RT | 276 | 265 | 277 | 227 | 222 | 220 | 258 | 246 | |
| 100° C. | 164 | 158 | 164 | 133 | 131 | 130 | 152 | 147 | |

(C) Glass fibers each having a length of not less than 1.0 mm and less than 3.0 mm (D) Glass fibers each having a length of not less than 3.0 mm

[Weight Average Fiber Length]

About 1 g of a skin layer (a portion having a depth up to 15% of the thickness of the test piece as measured thicknesswise from the surface of the test piece) and about 1 g of a core layer (an inner portion having a depth ranging from 15% to 85% of the thickness of the test piece as measured thicknesswise from the surface of the test piece) were sampled from each of the test pieces, and heat-treated at 600° C. for 3 hours by means of an electric furnace (Muffle Furnace FO810 available from Yamato Scientific Co., Ltd.) to be thereby ached. Fibers were selected at random from each of residual fiber masses, and photographed at a magnification of 50 to 100 by means of a microscope (VHX-1000 available from Keyence Corporation) (three to five The above results indicate that the test pieces of Examples were excellent in tensile strength at the ordinary temperature as well as in the high temperature atmosphere.

In contrast, the test pieces of Comparative Examples 1 to 3, in which the glass fibers fell outside the fiber length distribution specified by the present disclosure, were poorer in tensile strength than the test pieces of Examples. The test pieces of Comparative Examples 4 and 5, which were produced by the same production method by employing the same amounts of the same ingredients as the test pieces of Examples except for the colorant and employing the carbon blacks having greater particle diameters as the colorant, were poorer in tensile strength than the test pieces of Examples. This is because, in the test pieces of Comparative Examples 4 and 5, the glass fibers were broken by the carbon blacks during the injection molding and, as a result, fell outside the fiber length distribution specified by the present disclosure.

While specific forms of the embodiment of the present disclosure have been shown in the aforementioned inventive examples, the inventive examples are merely illustrative of the disclosure but not limitative of the disclosure. It is contemplated that various modifications apparent to those skilled in the art could be made within the scope of the disclosure.

The glass-fiber-reinforced thermoplastic resin molding product according to the present disclosure has excellent mechanical strength in the high temperature atmosphere or in the moisture absorbed state even without imparting the molding product with a greater wall thickness or taking other measures, and has sufficient distortion resistance and sufficient strength. Therefore, the glass-fiber-reinforced thermoplastic resin molding product is advantageously used as a transmission mount, a body mount, a carburetor mount, a member mount, a differential mount, an engine mount, a connecting rod, a torque rod, a torsional damper, a steering rubber coupling, a tension rod bush, a bush, a bound stopper, an FF engine roll stopper, a muffler hanger, a stabilizer link rod, a radiator support, a control arm, a suspension arm or other bearing part for a motor vehicle such as an automobile. Further, the glass-fiber-reinforced thermoplastic resin molding product permits flexible color design without impairing the aforementioned properties and, therefore, meets the need for coloring.

The invention claimed is:

1. A glass-fiber-reinforced poly/amide resin molding product comprising:
   a polyamide resin;
   a fibrous filler dispersed in the polyamide resin; and
   at least one of an organic dye and a carbon black having an average particle diameter of greater than zero and not more than 30 nm;
   wherein the fibrous filler is dispersed in an inner portion of the glass-fiber-reinforced polyamide resin molding product and in a surface portion of the glass-fiber-reinforced polyamide resin molding product;
   wherein the fibrous filler comprises:
   (A) 40 to 80% of glass fibers each having a length of not less than 0.05 mm and less than 0.5 mm;
   (B) 15 to 40% of glass fibers each having a length of not less than 0.5 mm and less than 1.0 mm;
   (C) 2 to 30% of glass fibers each having a length of not less than 1.0 mm and less than 3.0 mm; and
   (D) at most 1% of glass fibers each having a length of not less than 3.0 mm,
      based on a total number of fibers of the fibrous filler present in the glass-fiber-reinforced polyamide resin molding product;
   wherein a weight average fiber length of glass fibers dispersed in the inner portion of the glass-fiber-reinforced polyamide resin molding product is greater than a weight average fiber length of glass fibers dispersed in the surface portion of the glass-fiber-reinforced polyamide resin molding product, and a difference between these weight average fiber lengths is at least 30 µm;
   wherein the glass fibers each have a diameter of 3 to 25 µm;
   wherein the glass fibers are present in a total proportion in a range from 40 to 60 wt. %, and at least one of the organic dye and the carbon black is present in a total proportion of in a range from 0.01 to 1 wt. %;
   wherein the weight average fiber length of the glass fibers dispersed in the surface portion of the glass-fiber-reinforced polyamide resin molding product is in a range from 0.40 to 1.0 mm, and the weight average fiber length of the glass fibers dispersed in the inner portion of the glass-fiber-reinforced polyamide resin molding product is in a range of 0.45 to 1.5 mm.

2. The glass-fiber-reinforced polyamide resin molding product according to claim 1, wherein the glass-fiber-reinforced polyamide resin molding product is an automotive bearing part selected from the group consisting of transmission mounts, body mount, carburetor mounts, member mounts, differential mounts, engine mounts, connecting rods, torque rods, torsional dampers, steering rubber couplings, tension rod bushes, bushes, bound stoppers, FF engine roll stoppers, muffler hangers, stabilizer link rods, radiator supports, control arms, and suspension arms.

3. The glass-fiber-reinforced polyamide resin molding product according to claim 1, wherein the polyamide resin comprises polyamide 66.

4. The glass-fiber-reinforced polyamide resin molding product according to claim 1, wherein at least one of the organic dye and the carbon black is present in a total proportion of in a range from 0.03 to 0.3 wt. % in the glass-fiber-reinforced polyamide resin molding product.

5. The glass-fiber-reinforced polyamide resin molding product according to claim 1, wherein the organic dye is one selected from the group consisting of dyes of azo, anthraquinone, perinone, perylene, phthalocyanine, carbonium and indigoid.

6. The glass-fiber-reinforced polyamide resin molding product according to claim 1,
   wherein the weight average fiber length of glass fibers dispersed in the inner portion of the glass-fiber-reinforced polyamide resin molding product is greater than the weight average fiber length of glass fibers dispersed in the surface portion of the glass-fiber-reinforced polyamide resin molding product; and
   wherein the difference between these weight average fiber lengths is in a range of from 30 µm to 80 µm.

7. The glass-fiber-reinforced polyamide resin molding product according to claim 1,
   wherein the weight average fiber length of glass fibers dispersed in the inner portion of the glass-fiber-reinforced polyamide resin molding product is greater than the weight average fiber length of glass fibers dispersed in the surface portion of the glass-fiber-reinforced polyamide resin molding product, and
   wherein the difference between these weight average fiber lengths is in a range from 30 µm to 1100 µm.

8. A method for producing a glass-fiber-reinforced polyamide resin molding product comprising the steps of:
   feeding glass fibers and a mixture of a polyamide resin and at least one of an organic dye and a carbon black having an average particle diameter of greater than zero and not more than 30 nm directly into an injection molding machine; and
   injection-molding the resulting mixture;
   wherein the glass-fiber-reinforced polyamide resin molding product comprises the polyamide resin, a fibrous filler dispersed in the polyamide resin and the at least one of the organic dye and the carbon black having an average particle diameter of greater than zero and not more than 30 nm;
   wherein the fibrous filler is dispersed in an inner portion of the glass-fiber-reinforced polyamide resin molding product and in a surface portion of the glass-fiber-reinforced polyamide resin molding product;
   wherein the fibrous filler comprises:

(A) 40 to 80% of glass fibers each having a length of not less than 0.05 mm and less than 0.5 mm;
(B) 15 to 40% of glass fibers each having a length of not less than 0.5 mm and less than 1.0 mm;
(C) 2 to 30% of glass fibers each having a length of not less than 1.0 mm and less than 3.0 mm; and
(D) at most 1% of glass fibers each having a length of not less than 3.0 mm,
based on a total number of fibers of the fibrous filler present in the glass-fiber-reinforced polyamide resin molding product;
wherein a weight average fiber length of glass fibers dispersed in the inner portion of the glass-fiber-reinforced polyamide resin molding product is greater than a weight average fiber length of glass fibers dispersed in the surface portion of the glass-fiber-reinforced polyamide resin molding product, and a difference between these weight average fiber lengths is at least 30 µm;
wherein the glass fibers each have a fiber diameter of 3 to 25 µm;
wherein the glass fibers are present in a total proportion in a range from 40 to 60 wt. % and at least one of the organic dye and the carbon black is present in a total proportion of in a range from 0.01 to 1 wt. %; and
wherein the weight average fiber length of the glass fibers dispersed in the surface portion of the glass-fiber-reinforced polyamide resin molding product is in a range from 0.40 to 1.0 mm, and the weight average fiber length of the glass fibers dispersed in the inner portion of the glass-fiber-reinforced polyamide resin molding product is in a range of 0.45 to 1.5 mm.

9. The method for producing a glass-fiber-reinforced polyamide resin molding product according to claim 8,
wherein the weight average fiber length of glass fibers dispersed in the inner portion of the glass-fiber-reinforced polyamide resin molding product is greater than the weight average fiber length of glass fibers dispersed in the surface portion of the glass-fiber-reinforced polyamide resin molding product, and
wherein the difference between these weight average fiber lengths is in a range from 30 µm to 1100 µm.

10. A method for producing a glass-fiber-reinforced polyamide resin molding product comprising the steps of:
feeding glass fibers, a polyamide resin and at least one of an organic dye and a carbon black having an average particle diameter of greater than zero and not more than 30 nm directly into an injection molding machine; and injection-molding the resulting mixture;
wherein the glass-fiber-reinforced polyamide resin molding product comprises the polyamide resin, a fibrous filler dispersed in the polyamide resin and the at least one of the organic dye and the carbon black having an average particle diameter of greater than zero and not more than 30 nm;
wherein the fibrous filler is dispersed in an inner portion of the glass-fiber-reinforced polyamide resin molding product and in a surface portion of the glass-fiber-reinforced polyamide resin molding product;
wherein the fibrous filler comprises:
(A) 40 to 80% of glass fibers each having a length of not less than 0.05 mm and less than 0.5 mm;
(B) 15 to 40% of glass fibers each having a length of not less than 0.5 mm and less than 1.0 mm;
(C) 2 to 30% of glass fibers each having a length of not less than 1.0 mm and less than 3.0 mm; and
(D) at most 1% of glass fibers each having a length of not less than 3.0 mm,
based on a total number of fibers of the fibrous filler present in the glass-fiber-reinforced polyamide resin molding product;
wherein a weight average fiber length of glass fibers dispersed in the inner portion of the glass-fiber-reinforced polyamide resin molding product is greater than a weight average fiber length of glass fibers dispersed in the surface portion of the glass-fiber-reinforced polyamide resin molding product, and a difference between these weight average fiber lengths is at least 30 µm;
wherein the glass fibers each have a fiber diameter of 3 to 25 µm;
wherein the glass fibers are present in a total proportion in a range from 40 to 60 wt. % and at least one of the organic dye and the pigment is present in a total proportion of in a range from 0.01 to 1 wt. %; and
wherein the weight average fiber length of the glass fibers dispersed in the surface portion of the glass-fiber-reinforced polyamide resin molding product is in a range from 0.40 to 1.0 mm, and the weight average fiber length of the glass fibers dispersed in the inner portion of the glass-fiber-reinforced polyamide resin molding product is in a range of 0.45 to 1.5 mm.

11. The method for producing a glass-fiber-reinforced polyamide resin molding product according to claim 10,
wherein the weight average fiber length of glass fibers dispersed in the inner portion of the glass-fiber-reinforced polyamide resin molding product is greater than the weight average fiber length of glass fibers dispersed in the surface portion of the glass-fiber-reinforced polyamide resin molding product, and
wherein the difference between these weight average fiber lengths is in a range from 30 µm to 1100 µm.

* * * * *